March 1, 1949.  A. B. HENDERSON  2,462,965
HOISTING HOOK
Filed July 5, 1945

INVENTOR
ARTHUR B. HENDERSON
Ernest E Carver
ATTORNEY

Patented Mar. 1, 1949

2,462,965

UNITED STATES PATENT OFFICE 2,462,965

HOISTING HOOK

Arthur B. Henderson, Vancouver, British Columbia, Canada, assignor to Harry J. Turney, Vancouver, British Columbia, Canada Application July 5, 1945, Serial No. 603,294

2 Claims. (Cl. 24—241)

My invention relates to improvements in hoisting hooks, the objects of which are to provide a hoisting hook in which the load stresses upon the hook are equally divided on both sides of the clevis; to provide a hook wherein the bight of the hook is closed to prevent detachment of the load when the hoist line is slackened to the point of disaligning the hook and its hoist line, and also to insure maximum strength by providing three pairs of separate shear planes in the connecting members between the hook and its clevis with a view to providing as much or more strength in the connecting members as in the tensional parts of the hook. A still further object is to provide two connecting members between clevis and hook which are capable of supporting the maximum hook load and which are not subject to rotational movement and the wear incidental thereto, so that irrespective of any wear taking place in the pivot pin due to continued opening and closing the hook will still be able to safely carry its predetermined load.

Referring to the drawings.

In the drawings like characters of reference indicate corresponding parts in each figure.

Figure 1:
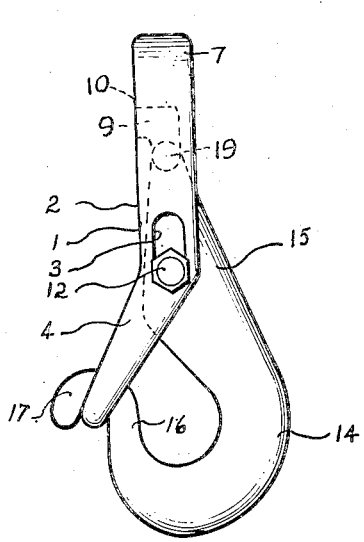
Fig. 1 is a side elevational view of the hook in closed position.
Figure 2:
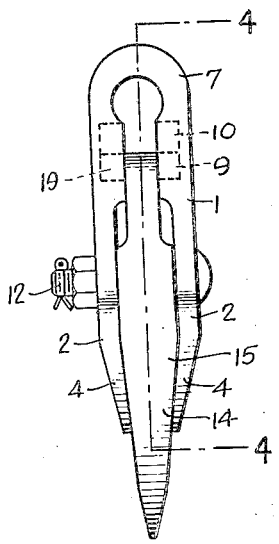
Fig. 2 is an end elevational view.
Figure 3:
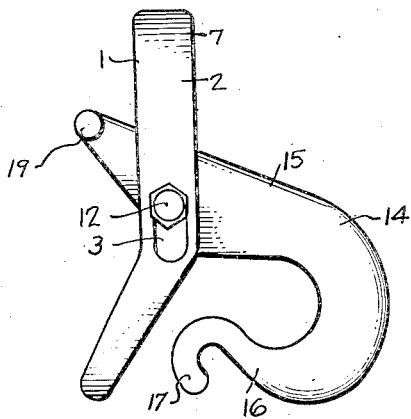
Fig. 3 is a side elevational view showing the hook open.
Figure 4:
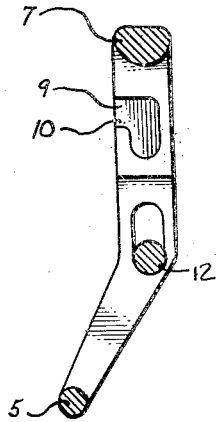
Fig. 4 is a sectional view of the clevis taken on the line 4—4 of Figure 2.

The numeral 1 indicates a clevis consisting of side members 2 which are slotted vertically as at 3 and are cranked below the slot as at 4 and provided with a connecting pin 5 formed integrally with the clevis. The upper ends of the members 2 are connected with a bridge piece 7 by which the hook is secured to a hoisting line, not shown. Inverted L-shaped recesses 9 are formed on the inner sides of the side members above the slot 3, the recesses being open as at 10 to the front edge of the clevis.

Swingingly mounted in the slots 3 and upon a pin 12 is a hook generally indicated by the numeral 14. The hook has an elongated shank 15 and a bill 16 which terminates in an outwardly and downwardly turned latch 17 adapted to rest upon the pin 5 of the clevis when the hook is in load carrying position. The upper extremity of the shank 15 is provided with transverse projections 19 the ends of which are adapted to rest within the recesses 9 of the clevis when the hook is closed as shown in Figure 1. It will be seen that the load stress on the connection between the hook and clevis is resisted at shear planes to both ends of the pin 12 in the slot 3, both ends of the pin against the latch 17, and both inner ends of the transverse projections 19 and inner side walls of the side members 2. It will be noted also that since the slot 3 is vertical and is aligned with the line of lift of the hook and its supporting line and that the axis through the mean stress section of the hook and the stress axis through the cranked portion 4 of the clevis are at equal angles from the line of lift that no eccentric strain can develop in the shank on either side of the slot 3.

To open the hook to apply a load, the hook member 14 is lifted and rocked about the pin 12 to remove the latch 17 from the pin 5 and move the projections 19 from the recess 9 until the bill 16 is separated from the cranked member 4, when a sling or other device can be freely passed over the latch 17 and onto the hook member 14.

What I claim as my invention is:

1. A hoist hook comprising spaced side members each having a vertical slot intermediate its length, a bridge piece connecting the upper ends and an integral pin connecting the lower ends of said side members together, a swinging hook having an elongated shank and a bill, said bill having a downwardly turned latch adapted to engage the connecting pin, a pivot pin extending through said hook and being seated at the base of the vertical slots when the hook is in load carrying position, said side members having a pair of opposed U-shaped elements and said shank having a pair of side projections adapted to seat in the bases of the U-shaped elements when the pivot pin is seated in the base of the vertical slots.

2. A hoist hook as claimed in claim 1 wherein the side projections on said shank and the pivot pin of the swinging hook are vertically aligned with the centre of gravity of the hook when in load carrying position.

ARTHUR B. HENDERSON.

REFERENCES CITED

The following references are of record in the file of this patent:

UNITED STATES PATENTS

| Number | Name | Date |
|---|---|---|
| 2,010,733 | Netz | Aug. 6, 1935 |
| 2,359,557 | Hoffman | Oct. 3, 1944 |